United States Patent

[11] 3,566,122

[72] Inventors T. O. Paine
Administrator of the National Aeronautics and Space Administration with Respect to an Invention of;
James M. Kendall, Sr., Pasadena, Calif.
[21] Appl. No. 805,405
[22] Filed Mar. 10, 1969
[45] Patented Feb. 23, 1971

[54] BLACK BODY CAVITY RADIOMETER
15 Claims, 4 Drawing Figs.
[52] U.S. Cl. .................................................. 250/83.3, 73/355
[51] Int. Cl. ...................................................... G01j 1/02
[50] Field of Search ........................................... 73/355(IF); 250/83.3(IR)

[56] References Cited
UNITED STATES PATENTS
2,305,396 12/1942 Volochine ..................... 73/355
2,366,285 1/1945 Percy et al. .................... (73/355UX)
3,461,290 8/1969 Webb ............................. 250/83.3(IR)
OTHER REFERENCES
Mendenhall, C. E. A Determination of the Stefan-Boltzmann Constant of Radiation. In the Physical Review. Vol. 34, No. 3. August 1, 1929. pp. 502—5 relied upon. Copy in 73/1(F).

Primary Examiner—Louis R. Prince
Assistant Examiner—Frederick Shoon
Attorneys—J. H. Warden, Monte F. Mott and G. T. McCoy ABSTRACT: A black body cavity radiometer is provided by a radiation receiving isothermal body having a short hollow cylinder with a hollow cone at one end. The cylinder is spun down at the other end to a smaller hollow cylinder of short length to form a radiation cavity having an aperture. A thermal guard surrounds the cavity, except over the aperture. The annular wall of the guard around the short cylindrical extension of the cavity is provided with an internally blackened groove which functions as an annular radiation trap for radiation from the internal surface of the guard and the external surface of the cavity. Glass rods or fibers maintain a thin annular space between the guard and the cylindrical extension of the cavity. A guard temperature sensing coil is provided on a hollow cylinder disposed in space between the guard and the cavity. The hollow cylinder is thermally connected to the guard by a flange. A heating and temperature sensing coil is wound directly on the main cylindrical portion of the cavity. A voltage is applied across the latter coil in sufficient amplitude to maintain the temperature of the latter coil equal to the temperature of the guard sensing coil. The magnitude of that voltage is a measure of radiation into the cavity through the aperture thereof.

JAMES M. KENDALL, SR.
*INVENTOR.*

BY

ATTORNEYS

JAMES M. KENDALL, Sr.
INVENTOR.

BY
ATTORNEYS

BLACK BODY CAVITY RADIOMETER

ORIGIN OF THE INVENTION

The invention described herein was made in the performance of work under a NASA contract and is subject to the provisions of Section 305 of the National Aeronautics and Space Act of 1958, Public Law 85—568 (72 Stat. 435; 42 USC 2457).

BACKGROUND OF THE INVENTION

This invention relates to a black body cavity radiometer, and more particularly to a radiometer having a cavity surrounded by an isothermal body except over an aperture in the cavity.

A radiometer of the type to which the present invention relates is disclosed in an application, Ser. No. 584,015, filed Oct. 3, 1966, by James M. Kendall, Sr., et al., now U.S. Pat. No. 3,461,290. The cavity disclosed is in the form of a hollow cone supported in a thermal guard by a glass rod at the apex thereof and glass-tipped screws at the base of the cone which is open to provide an aperture for the cavity. The thermal guard surrounding the aperture is also conical with the same half angle as the cone in order to provide a thin conically shaped space between the thermal guard and the aperture. The space is made as thin as possible in order to minimize radiation out from the space between the inside of the thermal guard and the outside of the cavity while still having the cavity thermally decoupled from the thermal guard by the glass rod at the apex of the cavity and the glass-tipped spacing screws around the aperture of the cavity.

A thin (1.5 mil = 0.0015'' diameter) enameled platinum wire having a high temperature coefficient of resistance and serving as a very accurate resistance thermometer is wound on the conical cavity in order to maintain it at a temperature of the thermal guard by sufficient current the amplitude of which then is a measure of radiation into the cavity.

A similar coil of 1.5 mil platinum wire in thermal contact with the thermal guard is provided to measure the thermal guard temperature and to serve as a control for regulating the magnitude of heating current through a heater winding to maintain the thermal guard at an accurately predetermined temperature.

To determine the amount of radiation being received by the conical cavity, a temperature sensing coil is provided on the thermal guard similar to the temperature sensing and heating coil provided on the conical cavity. A complex bridge circuit including the guard temperature sensing coil in one branch and the cavity winding in another branch is provided to control the supply of power of the cavity coil to maintain the cavity in temperature equilibrium with the thermal guard. Changes in the power supplied to the cavity winding are then a function of changes in radiation into the conical cavity.

OBJECTS AND SUMMARY OF THE INVENTION

An object of the present invention is to provide a new improved form for the internally blackened cavity of a radiometer.

Another object is to provide an improved form of the thermal guard of a black body cavity radiometer which facilitates providing a guard temperature sensing coil in good thermal contact with the thermal guard.

A further object is the provision of a trap for radiation from the space between the internal surface of the thermal guard and the external surface of the radiation cavity through a thin annular space between the thermal guard and the aperture of the cone.

Still another object of the invention is the provision of improved means for maintaining the thin annular space between the thermal guard and the aperture of the cavity.

Still another object is the provision of an improved electronic system for determining the amount of radiation being received by the internally blackened cavity through the aperture thereof.

Yet another object is design of a cavity which enhances the blackness of the internal coating, thereby making the radiometer less sensitive to a lack of perfect blackness of coating, and to provide a cavity receptor which is also more nearly equally sensitive to all wave lengths of incoming radiation in the ultraviolet, visible, and infrared ranges.

Another object is the provision of a cavity and thermal arrangement which improves response to radiation coming in from all directions over a hemisphere according to Lambert's Cosine Law.

Still another object of the invention is to provide a radiometer capable of very accurate absolute measurements of ultraviolet, visible, and infrared radiation.

Still another object of the invention is to provide a primary standard against which other radiometers can be calibrated.

These and other objects of the invention are achieved by a radiation receiving means having an internally blackened, isothermal cavity comprised of a hollow cylindrical portion between a hollow conical portion at one end thereof and a hollow truncated conical portion at the other end thereof. An aperture for the cavity is provided through the small diameter end of the truncated conical portion. A thermal guard surrounds the cavity except over the aperture in order to maintain isothermality of the surroundings of the cavity at a predetermined temperature. The cavity is thermally decoupled from the thermal guard by glass spacing rods, one at the apex of the truncated conical portion and a plurality disposed about the aperture of the cavity. The temperature of the thermal guard is determined by a first means comprising a coil of insulated wire in good thermal contact with the thermal guard, the material for the wire being selected from those metals which exhibit an appreciable change of resistance with temperature. A second means for measuring the temperature of the cavity, and for supplying to it an amount of heat to maintain it at the temperature of the thermal guard, comprises a first coil of insulated wire in good thermal contact with the inside of the guard, and a second wire coil electrically insulated from and in good thermal contact with the outside of the cavity. The wire coils are made of a material which, like the material for the guard sensing wire, undergoes an appreciable change of resistance with temperature. The resistance of the first wire coil is measured by means comprising a constant voltage source connected to a voltage dividing network which consists of the first wire coil resistance and a resistor of a known constant resistance. A voltmeter connected to the voltage dividing network provides a voltage reading that is a function of the resistance of the first wire coil (which is a function of the thermal guard temperature).

Electrical power is supplied to the second wire coil in an amount sufficient to maintain the temperature of the cavity equal to the temperature of the thermal guard. That power is supplied by means comprising a variable voltage supply connected to the second wire coil. The voltage is then varied until the resistance of the second wire coil is of that value which corresponds to the measured temperature of the thermal guard, which is to say corresponds to the measured resistance of the first wire coil. A simple bridge with a variable resistance in one branch and the second wire coil in another is provided with a nullmeter. The measured value of resistance for the first wire coil, as calibrated, is set into the variable resistor and the variable voltage supply is varied until the nullmeter indicates a null. A voltmeter across the voltage supply then provides a measurement which is a function of the electrical power required to maintain the temperature of the cavity equal to the temperature of the thermal guard. That power requirement is a measure of radiation into the cavity through the aperture thereof.

In accordance with an important feature of the present invention, the first wire coil is wound on and in good thermal contact with a hollow cylinder made of thermal conductive material and disposed between the thermal guard and the cavity with its axis substantially coincident with the axis of the cylindrical portion of the cavity. The hollow cylinder is then provided with a flange which is attached to the thermal guard for a good thermal connection. The second wire coil is wound on the cylindrical portion of the cavity using uninsulated wire. A sheet of suitable dielectric material provides electrical isolation between the second wire coil and the cavity. Alternatively, a film of insulating material, such as enamel, may be provided. A coating of suitable varnish is then placed over the second wire coil to hold the turns thereof in place and to decrease the thermal resistance between the wire of the second coil and the cavity.

An internally black coated radiation trap between the thermal guard and the aperture of the cavity is provided to reduce radiation through the annular space between the thermal guard and the aperture of the cavity from surface areas inside the thermal guard and outside the cavity. That radiation trap consists of an annular groove in the wall of the thermal guard which, with a cylindrical extension of the truncated portion of the cavity, forms the thermal decoupling space between the thermal guard and the cavity around the aperture thereof. The space is maintained by a plurality of glass rods disposed about the cylindrical extension of the cavity with their axis perpendicular to the axis of that cylindrical extension or with their axis parallel to the axis of that cylindrical extension.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Figure 1:
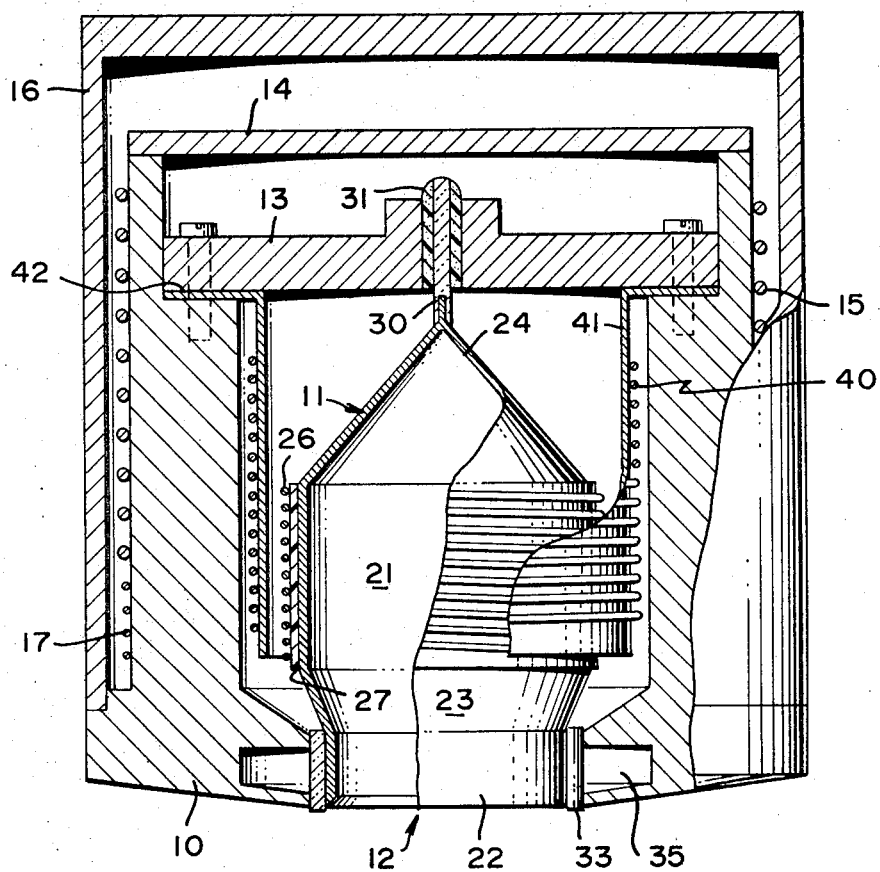
FIG. 1 is a sectional view of a black body cavity and thermal guard assembly constructed in accordance with the present invention.

In a preferred embodiment of the invention as shown in FIG. 1, the overall dimensions are typically 1.25 inches in diameter and 1.5 inches in length. Thus, the illustration of the present invention has been greatly enlarged in order to facilitate pointing out the various features of the invention. In so doing, the general proportions have been maintained, but it should be understood that the illustration is not a scaled drawing. Where important, the preferred dimensions for a black body cavity radiometer of those overall dimensions will be given.

The black body cavity radiometer consists essentially of a gold-plated thermal guard 10 of a suitable base material, such as copper or other thermal conductive material. The thermal guard 10 completely surrounds an internally blackened, isothermal, radiation cavity 11, except for the aperture 12 thereof. To complete the surrounding of the cavity 11 by the guard 10, end plates 13 and 14 are provided of the same material as the thermal guard 10. Accordingly, the end plates 13 and 14 are to be regarded as integral parts of the thermal guard 10. They are provided as separate parts only to facilitate assembling the black body cavity radiometer in the arrangement shown. Thus, when reference is made hereinafter to the thermal guard 10, the reference is to be considered as including the end plates 13 and 14. Specific reference to those plates will then be made only in describing specific features of the present invention.

Wound on the outside of the thermal guard is a heating coil of electrically insulated wire having suitable resistance such as nichrome, chromel or even-ohm wire of about 100 ohms. This winding 15 provides a means of raising the temperature of the surroundings of the cavity 11 to a temperature which is substantially higher than the environmental temperature outside a housing 16. A second winding 17 of smaller wire (such as 1.5 mil wire) and fewer number of turns is provided in thermal contact with the outside of the thermal guard 10. The material for that winding 17 is selected from those metals which undergo an appreciable change of resistance with temperature such as platinum, nickel, tungsten, and the like, in order that it serve as a sensor for controlling the thermal guard temperature in a manner to be described with reference to FIG. 4. The housing 16 is preferably gold-plated in order to minimize transfer of heat between the thermal guard and the environment around the housing 16 by radiation.

The cavity 11 is preferably fabricated from 5 mil thick silver. The preferred manner of fabrication consists of cutting a suitable length of nine-sixteenths inch tube for a central cylindrical portion 21 which is then spun down to a smaller cylindrical portion 22 connected to the central portion 21 by a short section 23 having the form of a truncated cone. The other end of the central cylindrical portion 21 is closed by a conical section 24 of the same material. That conical section of 40° half angle is silver soldered in order to maintain high thermal conductivity throughout the entire cavity.

The high thermal conductivity of the silver in the cavity 11 conducts heat from a winding 26, where it is generated, to the various areas of the cavity from which it is radiated out of the aperture 12. The greatest temperature drop anywhere in the cavity is usually less than 0.1°C due to the high thermal conductivity of silver. Thus, the cavity 11 is made of a material having high thermal diffusivity which assures rapid reestablishment of temperature equilibrium after any thermal change in any given area.

Figure 4:
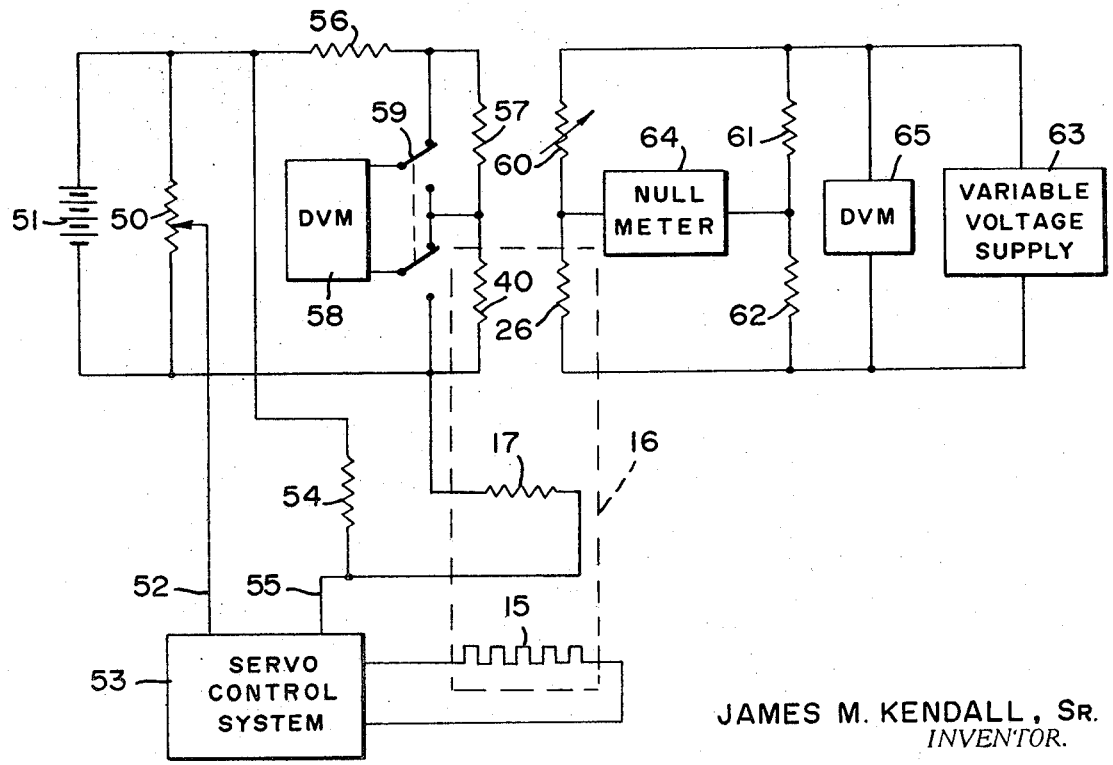
FIG. 4 is a simplified schematic diagram of electronic circuits for the black body cavity radiometer of FIG. 1.

The wire coil 26 is made of a metal which undergoes appreciable change of resistance with temperature preferably platinum, in order that it provide a highly accurate means for measuring the temperature of the cavity as well as a means for supplying to the cavity 11 power necessary to accurately maintain its temperature equal to the temperature of the thermal guard 10 in a manner to be more fully described with reference to FIG. 4. The wire coil 26 is electrically insulated from the silver cavity 11 by a sheet 27 of dielectric material 1 mil thick, such as a sheet of DuPont Kapton or Pyre ML. Once the wire coil 26 has been wound over the dielectric film 27 on the central portion 21 of the cavity 11, the turns of the coil are impregnated with a thin coating of varnish, such as Pyre ML varnish, to hold the turns in place and to increase the thermal conduction between the wire coil 26 and the cavity 11.

The internal surface of the cavity 11 is coated with a black matte, such as Parsons' black matte lacquer with an average weight of coating of 0.007 grams per square centimeter, which is just enough to provide a perfect black radiation surface. Heat provided to the cavity 11 by the wire coil 26 is radiated by the black surface out through the aperture 12. If the radiometer is placed in a vacuum and in total darkness, the power required to maintain the temperature of the cavity 11 equal to the temperature of the thermal guard 10 will be a maximum. If the radiometer is then exposed to radiation in the ultraviolet, visable and infrared ranges, the power required to maintain the temperature of the cavity 11 equal to the temperature of the thermal guard 10 will decrease in proportion to the amount of radiation passing into the cavity 11 through the aperture 12. Thus, the apparatus of FIG. 1 (with the electronic circuits of FIG. 4) may be used as a standard, total-radiation absolute radiometer against which other radiometers can be compared or calibrated. The high accuracy which makes use of this apparatus as a standard possible is due largely to the quasispherical shape of the cavity 11, the effect of which is to yield an enhanced effective emissivity and absorptivity through the aperture 12, both of which are substantially independent of coating characteristics.

The absorptivity of radiation by this quasispherical cavity 11 through the aperture 12 provides an accurate hemispherical or cosine response, a response sometimes referred to as Lambertian, according to Lamberts' Cosine Law. By that it is meant that radiation received and absorbed by the black surface of the cavity will be a function of the cosine of an angle between the axis of the cavity and the axis of a collimated beam of radiant energy as the radiometer is turned to different angles relative to the beam of radiant energy. Thus, for off-axis collimated radiation, the radiometer response is proportional to the cosine of the off-axis angle. Were this cosine response not present, it would not be possible to make sufficiently accurate measurements of isotropic, hemispherical radiation. Such measurements with high accuracy are desirable for spacecraft use. In that regard, it should be noted that the maximum operating temperature of the radiometer is limited only by the black matte coating inside the cavity. For Parson's black lacquer, the maximum operating temperature is about 200°C. This maximum temperature permits the measurements of intensities up to slightly over 0.28 watts per centimeter square.

The thermal coupling between the cavity 11 and the thermal guard 10 is made as small as possible, to avoid degrading sensitivity and accuracy. The outside surface of the cylindrical portion 21 of the cavity 11 is covered by the wire coil 26 as noted hereinbefore. Since power is applied to that coil in order to raise the temperature of the cavity as necessary to maintain its temperature equal to that of the thermal guard 10, the coated surface of the coil 26 would have high emissivity for radiation, thereby degrading the thermal decoupling otherwise provided by the space between the cavity 11 and the thermal guard 10. To correct that, and restore the desired thermal decoupling, a sleeve of aluminum foil one-half mil thick may be placed over the wire coil 26, thereby decreasing the emissivity of the coil 26. The remainder of the outside surface of the cavity 11 is bright silver and therefore has a sufficiently low emissivity for the desired thermal decoupling. The thermal guard 10 also has a low emissivity achieved by gold-plating the inside surface of the thermal guard 10 and polishing the gold-plated surface.

Figure 2:
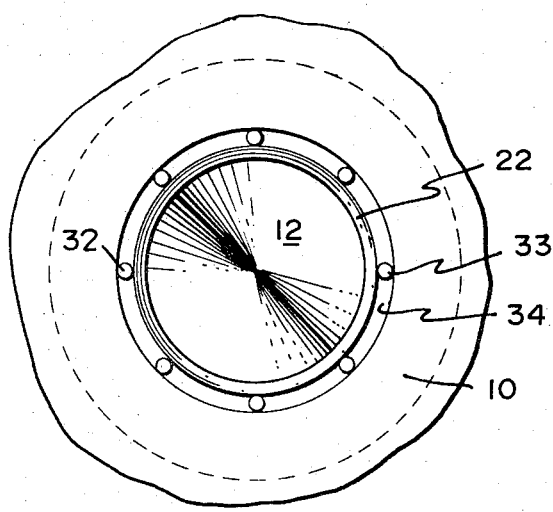
FIG. 2 is a simplified schematic end view of the assembly illustrated in FIG. 1 showing the manner in which glass rods or fibers are employed to maintain an annular space between the cavity and surrounding thermal guard.

A small glass tube 30 on the apex of the conical portion 24 of the cavity 11 is inserted into a hole in the end plate 13 and secured there in proper position by a suitable adhesive, such as an epoxy resin or other thermal setting material. In that manner, the apex of the cavity 11 is secured by a glass rod which does not degrade the desired thermal decoupling between the thermal guard 10 and the cavity 11. The other (aperture) end of the cavity 11 is spaced away from the thermal guard 10 by a plurality of glass rods or fibers, such as glass rods 32 and 33 evenly spaced around the aperture 12 between the cylindrical extension 22 of the cavity 11 and the thermal guard 10, as may be more clearly seen in the end view of FIG. 2. In that manner, a thin annular space 34 (FIG. 2) is provided between the cavity 11 and the thermal guard 10 around the aperture 12 in order to maintain the desired thermal decoupling between the thermal guard 10 and the cavity 11.

Figure 3:
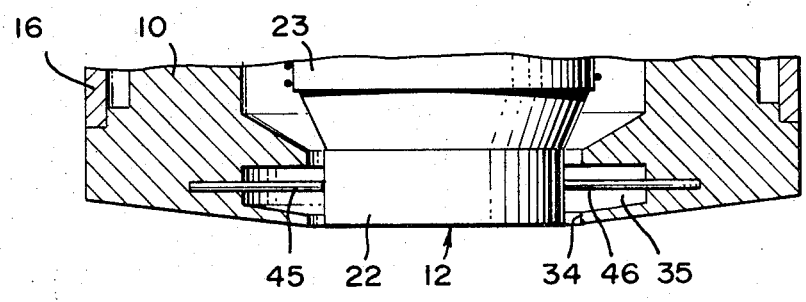
FIG. 3 illustrates a variation in the disposition of glass rods provided to maintain an annular space between a thermal guard and cavity.

FIG. 3 illustrates a variation in the use of glass rods to establish and maintain a space between the thermal guard 10 and cavity 11, and more particularly to establish and maintain the thin annular space 34. In this variant, an improvement over the prior art, spacing or centering glass rods, such as rods 45 and 46 are rooted inside the annular groove 35 and radially disposed with reference to the axis of the cavity 11. This variant has the advantage of turning the centering or spacing rods such that the ends thereof are not exposed to radiation. When the glass rods are axially disposed as in FIG. 1, the ends of the rods are exposed to radiation but the rods are fairly inefficient transmitters. Therefore, their sole function is to provide proper spacing between the thermal guard 10 and the cylindrical extension 22 which defines the aperture 10. In the variant illustrated in FIG. 3, the spacing rods are disposed perpendicular to the axis of the cylindrical extension 22. The thermal isolation provided between the thermal guard 10 and the cylindrical extension 22 is apt to be somewhat better but since they must be rooted in the groove 35, assembly is apt to be more time consuming.

Radiation entering the annular space 34 at a small angle would normally be reflected by the walls of that space and thereby be allowed to pass through that space into or out of the space between the thermal guard 10 and the cavity 11. To minimize that, an annular groove internally coated black is provided in the thermal guard 10 so that radiation entering the space 34 at a small angle will be trapped. In that manner, only radiation entering the space 34 at 0°, or very nearly 0°, will pass through the space 34. A substantial part of all other radiation entering that space 34 is trapped by groove 35 where it is reflected by its walls until absorbed by the thermal guard 10.

Located in the space between the thermal guard 10 and the cavity 11 is a guard temperature sensing coil 40 wound on a tube of good thermal conductive metal, such as 20 mil thick silver and in good thermal contact with the thermal guard 10 through the tube 41 via a flange 42 at one end thereof clamped between the thermal guard 10 and the end plate 13. The wire coil 40 wound on the cylinder 41 is preferably of enameled 1.5 mil platinum wire in order to measure the thermal guard temperature with the greatest possible accuracy.

The electronic circuits associated with the wire coils shown in FIG. 1 will now be described with reference to FIG. 4. The function of the thermal guard heating coil 15 and the thermal guard temperature sensing coil 17 is to maintain the temperature of the thermal guard at a predetermined temperature set by a potentiometer 50. That potentiometer is connected across a constant voltage source 51 to provide at an input terminal 52 of a servocontrol system 53 a reference voltage. The wire coil 17 is then connected in series with a resistor 54 and the voltage source 51. The junction between the wire coil 17 and the resistor 54 is connected to a terminal 55 of the servocontrol system 53 which compares the voltage at that terminal with the voltage at the terminal 52 to provide an error signal. The servocontrol system 53 responds to that error signal to increase or decrease current through the wire coil 15 to change the temperature of the thermal guard 10 and the wire coil 17 until the error signal is reduced to 0. In the prior art referred to hereinbefore, a thermocouple was employed with a guard temperature control unit to adjust current through a heating coil.

Referring next to the wire coil 40 provided to measure the thermal guard temperature which the servocontrol system 53 is to maintain constant, the wire coil 40 is connected in series with resistors 56 and 57 and the constant voltage source 51 in order to provide a voltage dividing network. A digital voltmeter 56 is connected by a two-pole, two-position switch 57 to measure the voltage drop across either the resistor 57 (as shown) or the wire coil 40. The resistor 57 is a relatively small precision resistor, such as a 1 K Ω resistor while the resistor 56 is a larger resistor, such as a 20 K Ω resistor. Since the precision resistor 57 carries the same current as the wire coil 40, a voltage reading is provided by the digital voltmeter 58 which is proportionate to the temperature of the wire coil 40 with the switch 59 in either position. The configuration of the digital voltmeter 58 permits determination of the resistance of the wire coil 40 to an accuracy of five significant figures with the switch 59 in either position by simple application of Ohms law. That resistance value is then employed to set a variable resistor 60 connected in series with the wire 26.

As noted hereinbefore, the wire coil 26 is provided in order to heat the cavity 11 until its temperature equals the thermal guard temperature as determined by the wire coil 40, and to measure the instantaneous temperature of the cavity 11 in order to determine what change is to be made in the power being supplied to the same wire coil to maintain the temperature of the cavity 11 equal to the temperature of the thermal guard 10. In that manner, the heating current put through the wire coil 26 serves as the temperature sensing current, or more properly, as the resistance sensing current (to determine the temperature of the cavity 11 as the resistance of the wire coil 26 varies with temperature).

A bridge circuit is completed by a pair of voltage dividing resistors 61 and 62 of equal value connected in parallel with the voltage dividing network comprising the variable resistor 60 and the wire coil 26. Each of the pair of resistors 61 and 62 is preferably a 1K Ω resistor while the variable resistors 60 is a network for conveniently setting in the determined value of resistance of the wire coil 40 as determined by the digital voltmeter 58. Once the value of the wire coil 40 has been set into the variable resistor 60, a voltage supply 63 is varied until sufficient power is applied to the wire coil 26 to heat the cavity 11 to a temperature equal to the temperature of the thermal guard 10, at which time the resistance of the wire coil 26 will be equal to the resistance of the variable resistor 60. That condition is detected by a nullmeter 64 having one terminal connected to a junction between the wire coil 26 and variable resistor 60, and the other terminal connected to a junction between the resistors 61 and 62. Once a null condition has been detected by the meter 64, the power being supplied by the variable voltage supply 63 is measured by a digital voltmeter 65. The change in power being supplied thus determined provides a measure of the change of temperature of the cavity 11 resulting from a change in incident radiation (i.e., change in radiation being received through the cavity 12).

This system for measuring the change in temperature of the cavity is simpler and more accurate than the system disclosed in the aforementioned copending application and has the further advantage that the thermal guard temperature sensing system is electrically isolated from the cavity temperature sensing system, and each of those systems is electrically separated from the thermal guard temperature control system. The greater accuracy is due in part to the better calibration of the thermal guard and cavity temperature sensing systems made possible by electrically separating the systems.

The resistance of the wire coil 26 on the cavity 11 is calibrated simultaneously with the calibration of the thermal guard sensor system. This is so because the variable resistor 60 is set to the resistance value of the wire coil 26 required for maintaining the cavity temperature equal to the temperature of the thermal guard 10. As noted hereinbefore, the variable voltage supply 63 is then manually adjusted until the heating current through the wire coil 26 raises the temperature of the cavity 11 to exactly that of the thermal guard 10. When the resistance of the wire coil 26 is equal to the resistance set into the variable resistor 60, the nullmeter reads 0 and the digital voltmeter 65 reads the voltage E across the bridge. Since one-half of the voltage E is across the wire coil 26, the power being applied to maintain the cavity temperature equal to the temperature of the thermal guard 10 is simply $(E/2)2R$, where R is equal to the resistance value set into the variable resistor 60.

Two copper wire leads (No. 40 AWG) connect the variable voltage supply 63 to the wire coil 26 through very small openings in the thermal guard 10 and housing 16. The leads enter and leave the coil 26 at a point (not shown) on the wire coil 26 where the temperature is of very nearly average value, which is a midpoint where the temperature is very nearly equal to the temperature of the thermal guard 10 so that there is very little heat conduction by the leads between the otherwise thermally decoupled thermal guard 10 and cavity 11. Thus, because of their place of attachment, the leads contribute very little to any undesired thermal coupling between the thermal guard 10 and the cavity 11.

A technique for calibrating the temperature sensing wire coils 26 and 40 consists of placing the radiometer in an oven of great mass well insulated from the surrounding environment to maintain the surrounding temperature of the radiometer at precisely determined and controlled temperatures. For each temperature at which the oven is then held constant, resistances of the wire coils 26 and 40 are measured. To this calibration data miscellaneous small corrections may be made to further improve accuracy.

Although particular embodiments of the invention have been described and illustrated herein, it is recognized that modifications and variations may readily occur to those skilled in the art and consequently it is intended that the claims be interpreted to cover such modifications and equivalents.

We claim:

1. In a black body cavity radiometer, the combination comprising:
   a radiation receiving, isothermal body having an internally blackened cavity and having an aperture for passage of radiation into said cavity;
   an annular wall forming a thermal guard surrounding said body, except in an annular area around said aperture, for maintaining isothermality of the surroundings of said body at a predetermined temperature, said body being thermally decoupled from said guard; and
   a radiation trap in said thermal guard, said trap comprising a groove in said annular wall of said guard surrounding said aperture, said groove being internally blackened, whereby radiation from surface areas inside said guard and outside said body which would otherwise pass through said annular space are trapped.

2. The combination as defined in claim 1 wherein said aperture is surrounded by a short cylindrical extension of said body the end of which is substantially even with the outside surface of said thermal guard surrounding said body around said aperture, whereby a thin annular space is provided between said cylindrical extension of said body and said annular wall of said guard surrounding said aperture.

3. The combination as defined in claim 2 wherein said annular space is maintained by a plurality of glass rods disposed about said cylindrical extension of said body.

4. The combination as defined in claim 3 wherein said glass rods are disposed about said cylindrical extension, with their axis perpendicular to the axis of sad cylindrical extension.

5. The combination as defined in claim 4 wherein said glass rods are disposed with their axis parallel to the axis of said cylindrical extension.

6. An improved electronic system for determining the amount of radiation being received by a body into a cavity therein through an aperture thereof, the walls of said cavity being blackened to form a black body cavity, comprising:
   a cylinder surrounding said body over a substantial portion thereof with the axis of said cylinder passing approximately through the center of said aperture;
   means for maintaining the surroundings of said body and said cylinder at a constant temperature except over said aperture;
   a first wire coil wound on said cylinder, said first wire coil being made of a material having a temperature coefficient of resistance such that said material undergoes an appreciable change of resistance with a change of temperature, and being thermally and electrically isolated from said body, whereby the resistance of said first coil is a function of the temperature of the surroundings of said body;
   means for determining the resistance of said first wire coil;
   a second wire coil wound around the outside of said body, said second wire coil being made of a material having a temperature coefficient of resistance such that said material undergoes an appreciable change of resistance with temperature, and being thermally coupled to but electrically isolated from said body, whereby the resistance of said second coil is a function of the temperature of said body;
   a variable resistor connected in series with said second wire coil in a circuit electrically isolated from said means for determining the resistance of said first wire coil, said variable resistor being adapted to be set equal to the resistance of said first wire coil as determined by said resistance determining means;
   a source of variable voltage connected in series with said second coil;

means for varying said voltage until the resistance of said second coil equals the resistance set into said variable resistor; and means for determining the voltage being applied to said second coil when the resistance of said second coil is equal to the resistance of said variable resistor.

7. An improved system as defined in claim 6 wherein said means for varying said voltage comprises a bridge circuit having a pair of substantially equal resistors connected in series, said series connected resistors being connected in parallel with said variable voltage and in parallel with a circuit consisting of said second wire coil in series with said variable resistor, said bridge circuit having a means for determining a null in current between a junction of said pair of resistors and a junction of said second coil with said variable resistor as said variable voltage source is varied.

8. A body having an internally blackened cavity for a radiometer comprising:

a hollow conical member internally blackened;

a hollow truncated conical member internally blackened, the base of said truncated conical member having a given diameter equal to the base of said conical member;

an internally blackened hollow cylindrical member of said given diameter thermally connecting the base of said conical member to the base of said truncated conical member, whereby a cavity is provided with an aperture through the small diameter end of said truncated conical member; and a short cylindrical member provided as an extension of said truncated conical member around said aperture, said extension being internally blackened.

9. The combination defined in claim 8 including an isothermal housing surrounding said body except over said aperture, said housing having an annular wall surrounding said cylindrical extension of said truncated conical member, but spaced therefrom by rods having high thermal impedance.

10. A body as defined in claim 9 wherein said annular wall has an internally blackened annular groove, whereby radiation through space between said annular wall and said cylindrical extension is trapped.

11. A body as defined in claim 9 wherein said rods are glass.

12. A body as defined in claim 11 wherein said rods are disposed about the axis of said cylindrical extension with the axis of each of said rods orthogonal to the axis of said cylindrical extension.

13. A body as defined in claim 12 wherein said annular wall has an internally blackened annular groove, whereby radiation through space between said annular wall and said cylindrical extension is trapped.

14. A body as defined in claim 11 wherein said rods are disposed about the axis of said cylindrical extension with the axis of each of said rods parallel to the axis of said cylindrical.

15. A body as defined in claim 14 wherein said annular wall has an internally blackened annular groove, whereby radiation through space between said annular wall and said cylindrical extension is trapped.